(12) United States Patent
Nishimura et al.

(10) Patent No.: US 10,913,470 B2
(45) Date of Patent: Feb. 9, 2021

(54) RAILCAR STEERING BOGIE INCLUDING BRAKE UNIT

(71) Applicant: KAWASAKI JUKOGYO KABUSHIKI KAISHA, Kobe (JP)

(72) Inventors: Takehiro Nishimura, Kobe (JP); Yoshi Sato, Sanda (JP); Yukitaka Taga, Kobe (JP); Yousuke Tsumura, Kobe (JP); Keiichiro Kamura, Kobe (JP); Fumikazu Kounoike, Kakogawa (JP); Koichi Murata, Kobe (JP); Francois Olivier Uchida, Kobe (JP); Yuta Yoshimatsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 248 days.

(21) Appl. No.: 16/070,322

(22) PCT Filed: Nov. 28, 2016

(86) PCT No.: PCT/JP2016/004979
§ 371 (c)(1),
(2) Date: Jul. 16, 2018

(87) PCT Pub. No.: WO2017/122242
PCT Pub. Date: Jul. 20, 2017

(65) Prior Publication Data
US 2019/0016354 A1    Jan. 17, 2019

(30) Foreign Application Priority Data
Jan. 14, 2016  (JP) ................. 2016-005203

(51) Int. Cl.
*B61F 13/00*    (2006.01)
*B61H 13/20*    (2006.01)
(Continued)

(52) U.S. Cl.
CPC ............. *B61H 13/20* (2013.01); *B61F 5/302* (2013.01); *B61F 5/44* (2013.01); *B61F 5/46* (2013.01);
(Continued)

(58) Field of Classification Search
CPC ........ B61H 13/00; B61H 13/20; B61H 13/24; B61H 13/28; B61H 13/30; B61H 13/36;
(Continued)

(56) References Cited

U.S. PATENT DOCUMENTS 4,428,301 A * 1/1984 Jackson .................... B61F 3/08
105/168

FOREIGN PATENT DOCUMENTS

| CN | 201102552 Y | 8/2008 |
| CN | 101588952 A | 11/2009 |

(Continued)

*Primary Examiner* — Robert J McCarry, Jr.
(74) *Attorney, Agent, or Firm* — Oliff PLC (57) ABSTRACT

A railcar steering bogie includes a bogie frame, a wheelset, an axle box suspension, a steering mechanism configured to steer the wheelset, a brake unit, and a brake unit support link. The brake unit includes: a main body frame; a brake shoe supported by the main body frame and pressed against a wheel tread of the wheel during braking. The brake unit support link couples the axle box suspension and the brake unit and transmits displacement of the axle box in a car longitudinal direction to the brake unit at least during steering performed by the steering mechanism. The brake unit support link restricts the brake unit from being displaced outward in a car width direction by a predetermined distance or more during the braking. At least one of a side surface of the brake unit support link and a side surface of the brake unit includes a sliding surface.

7 Claims, 5 Drawing Sheets

(51) Int. Cl.
*B61F 5/46* (2006.01)
*B61H 1/00* (2006.01)
*B61F 5/44* (2006.01)
*F16D 65/06* (2006.01)
*B61H 13/34* (2006.01)
*F16D 49/00* (2006.01)
*B61F 5/30* (2006.01)
*B61F 5/52* (2006.01)

(52) U.S. Cl.
CPC ............... *B61F 5/52* (2013.01); *B61H 1/00* (2013.01); *B61H 13/34* (2013.01); *F16D 49/00* (2013.01); *F16D 65/06* (2013.01)

(58) Field of Classification Search
CPC ... B61H 13/38; B61F 3/00; B61F 3/02; B61F 5/00; B61F 5/02; B61F 5/38
See application file for complete search history.

(56) References Cited

FOREIGN PATENT DOCUMENTS

| | | |
|---|---|---|
| JP | S57-181668 U | 11/1982 |
| JP | H08-11717 A | 1/1996 |
| JP | 2002-104184 A | 4/2002 |
| WO | 2009/072692 A1 | 6/2009 |

\* cited by examiner

RAILCAR STEERING BOGIE INCLUDING BRAKE UNIT

TECHNICAL FIELD

The present invention relates to a railcar steering bogie including a brake unit.

BACKGROUND ART

A steering bogie smoothly pass through a curved track by steering wheelsets when passing through a curved line. Typically, a wheel tread brake type brake unit is fixed to a bogie frame. Therefore, when relative positions of the wheelset and the bogie frame changes during steering, a gap between a wheel tread of a wheel and a brake shoe of the brake unit also changes. Therefore, an adjuster configured to keep the gap between the brake shoe and the wheel constant is provided in some cases.

PTL 1 proposes a steering bogie configured such that: the brake unit is supported so as to be movable relative to the bogie frame in a car longitudinal direction; and an axle box and the brake unit are coupled to each other by a link member. According to this configuration, even when the wheel moves relative to the bogie frame in the car longitudinal direction by steering the wheelset when passing through the curved line, the brake unit moves in conjunction with the movement of the wheel in the same direction as the wheel by the same distance as the wheel. Thus, the gap between the wheel tread of the wheel and the brake shoe is appropriately kept.

In railcar bogies, such as steering bogies and non-steering bogies, the wheel tread of the wheel has a wheel tread gradient inclined outward in a car width direction. Therefore, when the brake shoe is pressed against the wheel tread of the wheel during braking, generated is escaping force (shoe escaping force) of moving the brake shoe outward in a car width direction of the bogie along the wheel tread gradient. When the escaping force acts on the brake shoe, there is a possibility that the brake shoe is inclined and unevenly worn away, and therefore, braking force of the brake unit becomes unstable.

PTL 2 proposes a non-steering bogie configured such that: a plate-shaped shoe escape preventing receiving seat is provided so as to overlap the brake shoe in a side view; and a rubbing plate is fixed to an inside surface of the shoe escape preventing receiving seat. With this configuration, the rubbing plate slidably guides the shoe escape stopping guide portion in accordance with the movement of the brake shoe during braking. Thus, the brake shoe is prevented from escaping.

PTL 3 discloses a non-steering bogie configured such that a pair of brake shoe heads opposed to each other in the car width direction are coupled to each other by a connection bar and an escape preventing rod. According to this configuration, the escaping forces acting on a pair of brake shoes cancel each other, and this prevents the brake shoes from escaping.

CITATION LIST

Patent Literature

PTL 1: Japanese Laid-Open Patent Application Publication No. 8-11717
PTL 2: Japanese Laid-Open Utility Model Application Publication No. 57-181668
PTL 3: Japanese Laid-Open Patent Application Publication No. 2002-104184

SUMMARY OF INVENTION

Technical Problem

However, in the steering bogie, in addition to the displacement of the brake shoe during braking, the displacement of the wheelset by steering occurs in some cases. Therefore, if a brake shoe escape preventing structure of PTL 2 is applied to the steering bogie, there is a possibility that the shoe escape stopping guide portion is displaced beyond a sliding range in accordance with the movement of the brake shoe, and the brake shoe escapes in the car width direction.

If a brake shoe escape preventing structure of PTL 3 is applied to the steering bogie, the weight of the bogie increases by the connection bar and the escape preventing rod.

An object of the present invention is to provide a steering bogie which is prevented from increasing in weight while preventing a brake shoe from escaping in a car width direction.

Solution to Problem

A railcar steering bogie including a brake unit according to one aspect of the present invention includes: a bogie frame; a wheelset including an axle and a pair of wheels; an axle box suspension coupling an axle box and the bogie frame, the axle box accommodating a bearing supporting the axle; a steering mechanism configured to steer the wheelset; a brake unit including a main body frame including an upper portion rotatably attached to the bogie frame and a brake shoe supported by the main body frame and pressed against a wheel tread of the wheel during braking; and a brake unit support link coupling the axle box suspension and the brake unit and configured to transmit displacement of the axle box in a car longitudinal direction to the brake unit at least during steering performed by the steering mechanism, the brake unit support link restricting the brake unit from being displaced outward in a car width direction by a predetermined distance or more during the braking, at least one of a side surface of the brake unit support link and a side surface of the brake unit including a sliding surface.

According to the above configuration, the brake unit support link and the brake unit are displaced in the car longitudinal direction in conjunction with each other. Therefore, a relative displacement magnitude between the brake unit support link and the brake unit is suppressed during the steering of the wheelset, and it is unnecessary to lengthen the sliding surface in the car longitudinal direction. On this account, the weight of the steering bogie can be prevented from increasing while appropriately preventing the brake shoe from escaping in the car width direction.

Advantageous Effects of Invention

According to the present invention, the weight of the steering bogie including the brake unit can be prevented from increasing while preventing the brake shoe from escaping in the car width direction.

DESCRIPTION OF EMBODIMENTS

Hereinafter, embodiments will be explained with reference to the drawings. In the drawings, the same reference signs are used for the same or corresponding components, and a repetition of the same explanation is avoided.

Embodiment 1

Figure 1:
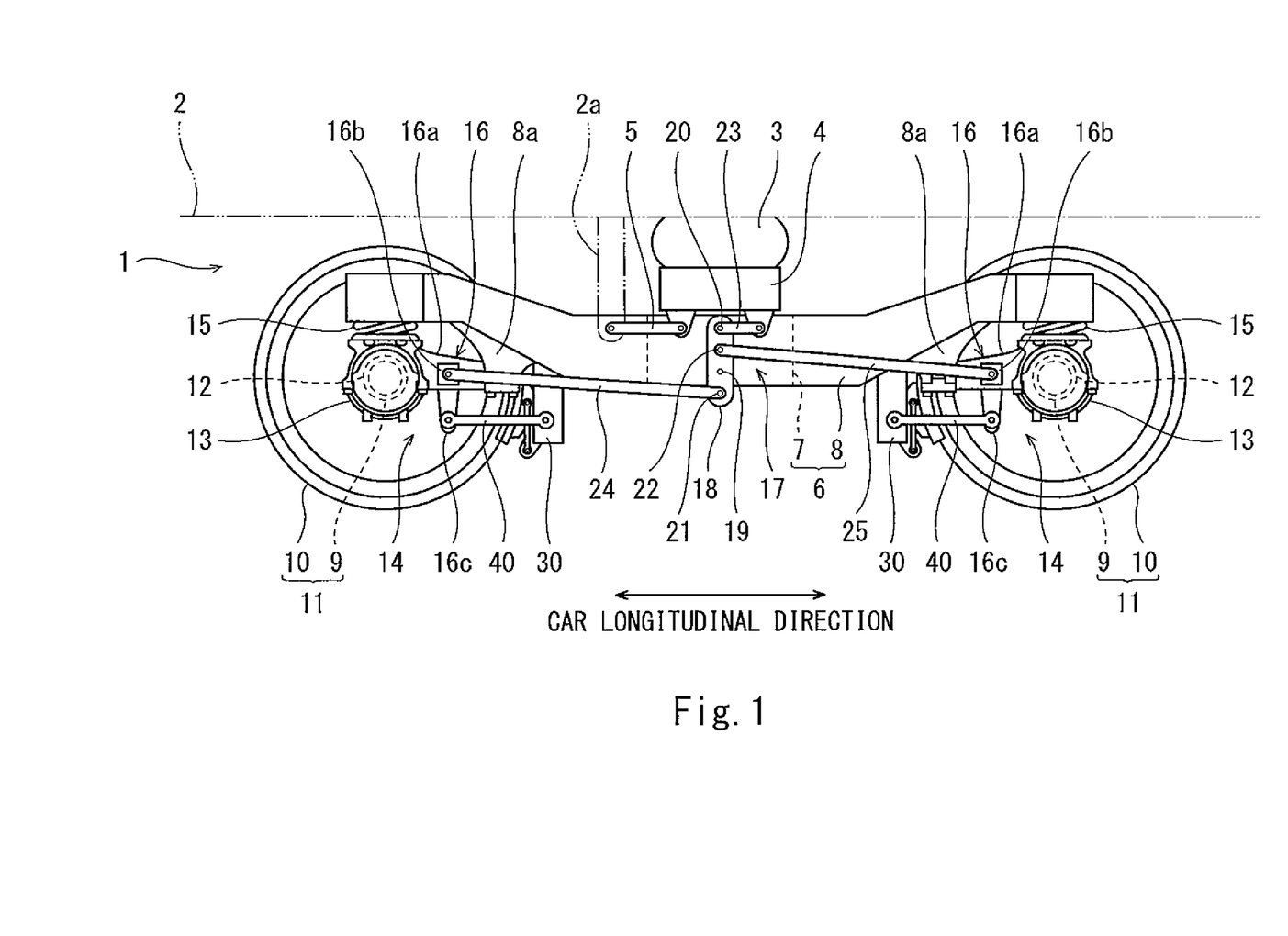
FIG. 1 is a side view of a railcar steering bogie according to Embodiment 1.

FIG. 1 is a side view of a railcar steering bogie 1 according to Embodiment 1. As shown in FIG. 1, the railcar steering bogie (hereinafter referred to as a "steering bogie") 1 includes: a bogie frame 6 including a cross beam 7 and side sills 8; a bolster 4 extending in a car width direction and supporting a carbody 2 through an air spring 3; and a steering mechanism 17. The bolster 4 is connected to a bracket 2a of the carbody 2 by a bolster anchor 5. The bolster 4 is connected to the bogie frame 6 through a turn guide mechanism (for example, a center pin and a center plate) arranged at a bogie center. To be specific, the bogie frame 6 supports the bolster 4 from below so as to be rotatable relative to the bolster 4 in a yawing direction.

The bogie frame 6 includes the cross beam 7 and the pair of side sills 8. The cross beam 7 extends in the car width direction under the bolster 4. The side sills 8 are connected to both respective car width direction end portions of the cross beam 7 and extend in a car longitudinal direction. A pair of wheelsets 11 are arranged at both respective car longitudinal direction sides of the cross beam 7. Each of the wheelsets 11 includes: an axle 9 extending in the car width direction; and a pair of wheels 10 provided at the axle 9. Bearings 12 rotatably supporting the axle 9 are provided at both respective car width direction end portions of the axle 9 so as to be located outside the respective wheels 10 in the car width direction. The bearings 12 are accommodated in respective axle boxes 13.

Each of the axle boxes 13 is elastically coupled to the bogie frame 6 by a corresponding one of axle box suspensions 14. Each of the axle box suspensions 14 includes an axle spring 15 and an axle beam 16. The axle spring 15 connects the axle box 13 and a car longitudinal direction end portion of the side sill 8 in an upward/downward direction. The axle beam 16 couples the axle box 13 and the side sill 8 in the car longitudinal direction. The axle beam 16 is molded integrally with the axle box 13. The axle beam 16 includes an axle beam main body portion 16a, a first bracket portion 16b, and a second bracket portion 16c.

The axle beam main body portion 16a extends in the car longitudinal direction. A tip end portion of the axle beam main body portion 16a is coupled to a receiving seat 8a of the side sill 8 through an elastic bushing and a core rod (not shown). Since the axle beam main body portion 16a is elastically coupled to (the side sill 8 of) the bogie frame 6 by the elastic bushing as above, the axle box 13 is displaceable relative to the bogie frame 6 in the car longitudinal direction. The first bracket portion 16b extends from the axle beam main body portion 16a outward in the car width direction (see FIG. 3) and is coupled to a steering lever 18 through a below-described first steering link 24. The second bracket portion 16c is coupled to a brake unit 30 through a brake unit support link 40.

The steering mechanism 17 steers the pair of wheelsets 11 by tilting the pair of wheelsets 11 relative to the bogie frame 6 in the yawing direction. The steering mechanism 17 includes the steering lever 18 arranged outside the bogie frame 6 in the car width direction. The steering lever 18 includes a fulcrum 19, a force point 20, a first action point 21, and a second action point 22. The first action point 21 is arranged at one side of the steering lever 18, and the second action point 22 is arranged at the other side of the steering lever 18. The steering lever 18 is supported by the bogie frame 6 so as to be rotatable about an axis extending in the car width direction at the fulcrum 19. The steering lever 18 is coupled to the bolster 4 through a coupling link 23 at the force point 20.

The steering lever 18 is coupled to the first bracket portions 16b of the axle beams 16 through steering links 24 and 25 at the action points 21 and 22. To be specific, the steering lever 18 is coupled to the axle box 13, located at one side in the car longitudinal direction, through the first steering link 24 (and the axle beam 16) at the first action point 21 and also coupled to the axle box 13, located at the other side in the car longitudinal direction, through the second steering link 25 at the second action point 22. According to this configuration, when the steering bogie 1 passes through a curved track, the steering mechanism 17 operates in conjunction with the turning of the bogie frame 6 relative to the bolster 4 about a vertical axis. With this, the steering lever 18 turns about the fulcrum 19 in a vertical flat plane, and this displaces the axle boxes 13 relative to the bogie frame 6 in the car longitudinal direction. Thus, the pair of wheelsets 11 are steered.

Figure 2:
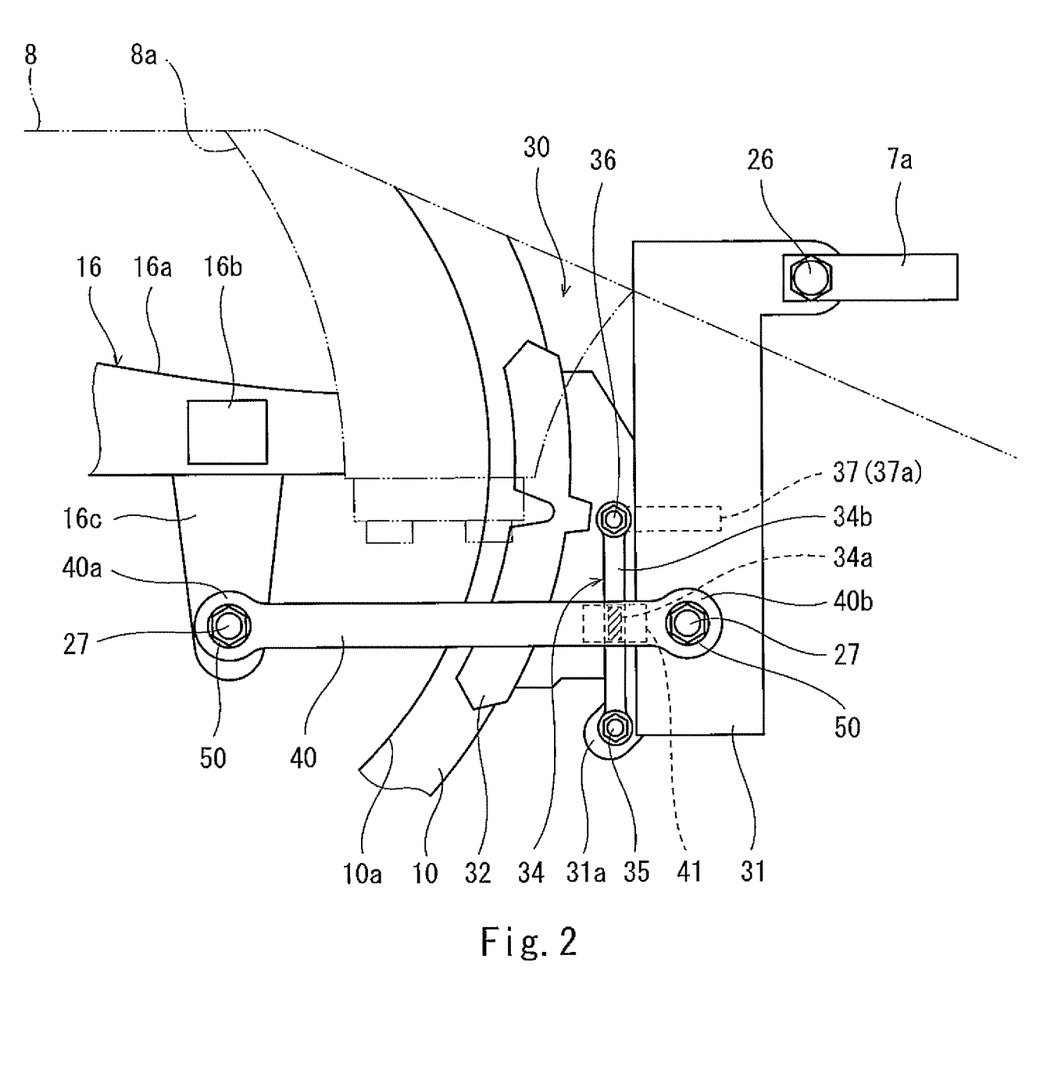
FIG. 2 is a side view of major components of the railcar steering bogie shown in FIG. 1.
Figure 3:
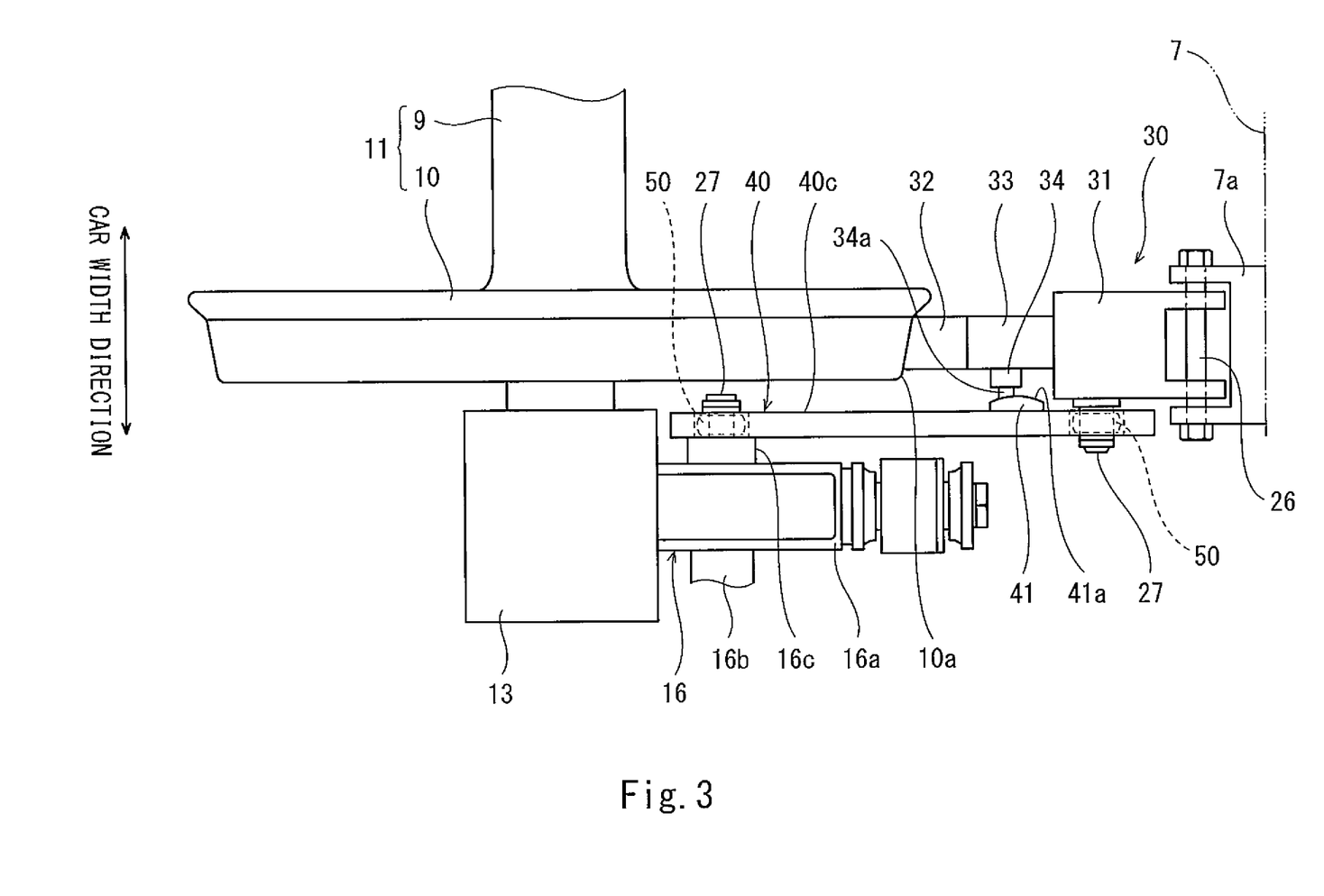
FIG. 3 is a plan view of major components of the railcar steering bogie of FIG. 1 during braking.

FIG. 2 is a side view of major components of the steering bogie 1 shown in FIG. 1. FIG. 3 is a plan view of major components of the steering bogie 1 of FIG. 1 during braking. As shown in FIGS. 2 and 3, the brake unit 30 includes a main body frame 31, a brake shoe 32, a brake shoe head 33, and a link member 34. One side of the main body frame 31 is rotatably supported by an attaching seat 7a provided at the cross beam 7. Specifically, a coupling pin 26 extending in the car width direction is inserted into the attaching seat 7a, and an upper portion of the main body frame 31 is rotatable relative to the cross beam 7 through the coupling pin 26. In the present embodiment, the attaching seat 7a is fixed to the cross beam 7 by welding but may be fixed by a fastening member, such as a bolt.

The other side of the main body frame 31 is coupled to the axle beam 16 through the brake unit support link 40 extending in the car longitudinal direction. Specifically, as shown in FIG. 2, a lower portion of the main body frame 31 is coupled to the second bracket portion 16c of the axle beam 16 through the brake unit support link 40. The second bracket portion 16c is provided at a car width direction inside surface of the axle beam main body portion 16a and extends downward.

A car longitudinal direction end portion 40a of the brake unit support link 40 is coupled to the second bracket portion 16c of the axle beam 16 through a pin member 27 and a spherical bearing 50, and a car longitudinal direction end portion 40b of the brake unit support link 40 is coupled to a lower portion of the main body frame 31 through a pin member 27 and a spherical bearing 50. The configuration of the spherical bearing 50 will be described later. With this configuration, when the wheelset 11 supported by the axle boxes 13 is displaced in the car longitudinal direction during steering, the displacement of the wheelset 11 is transmitted to the brake unit 30 through the brake unit support link 40. To be specific, in conjunction with the displacement of the wheelset 11 in the car longitudinal direction, the brake unit 30 is also displaced together with the brake unit support link 40 in the same direction as the wheelset 11 by the same distance as the wheelset 11.

The brake shoe 32 is a friction member and is fixed to the brake shoe head 33. By transmitting driving force of a drive mechanism 37 to the brake shoe head 33, the brake shoe 32 can advance or retreat relative to a wheel tread 10a together with the brake shoe head 33. The drive mechanism 37 is accommodated in the main body frame 31 and includes a push rod 37a configured to linearly move in the car longitudinal direction.

The brake shoe head 33 is fixed to the main body frame 31 through the link member 34 extending in the upward/downward direction. As shown in FIG. 2, a lower end portion of the link member 34 is rotatably coupled to the brake shoe head 33 by a coupling pin 35. An upper end portion of the link member 34 is rotatably coupled to the brake shoe head 33 by a coupling pin 36, and the coupling pin 36 couples the brake shoe head 33 and a tip end of the push rod 37a. When the drive mechanism 37 operates, and this moves the push rod 37a linearly, the brake shoe 32 advances or retreats in the car longitudinal direction together with the brake shoe head 33. At this time, the link member 34 rotates about the coupling pin 35. When the brake shoe 32 is pressed against the wheel tread 10a of the wheel 10, the link member 34 receives reaction force generated at the brake shoe head 33 by friction between the wheel 10 and the brake shoe 32 and acting in a wheel rotational direction.

The wheel tread 10a of the wheel 10 has a wheel tread gradient inclined outward in the car width direction. Therefore, when the brake shoe 32 is pressed against the wheel tread 10a, there is a possibility that the brake shoe 32 escapes along the wheel tread gradient toward a car width direction outer side of the steering bogie 1, and the brake unit 30 is displaced outward in the car width direction. The brake unit support link 40 of the present embodiment also has a function of restricting the brake unit 30 from being displaced outward in the car width direction by a predetermined distance or more during braking. Hereinafter, details will be explained.

As shown in FIG. 3, the brake unit support link 40 extends in the car longitudinal direction at a car width direction outer side of the wheel 10 and the brake unit 30. As shown in FIG. 2, the brake unit support link 40 is arranged at a position deviated from the axle beam 16 in a vertically lower direction. The brake unit support link 40 includes a slide plate 41 at a car width direction inside surface 40c thereof, the slide plate 41 being made of, for example, metal. In the present embodiment, the slide plate 41 is fixed to the brake unit support link 40 by welding but may be fixed by an adhesive or a fastening member, such as a bolt.

The link member 34 is formed integrally with a protruding portion 34a projecting from an outside surface 34b of the link member 34 outward in the car width direction and has a function of a shoe escape preventing receiving seat. For convenience of explanation, in FIG. 2, the protruding portion 34a is shown by diagonal lines. It should be noted that the protruding portion 34a may be formed separately from the link member 34 and fixed to the outside surface 34b by welding, a fastening member, or the like.

The protruding portion 34a of the link member 34 is in contact with a sliding surface 41a of the slide plate 41. Therefore, the brake shoe 32 is restricted from being displaced toward a car width direction outer side of the steering bogie 1, and thus, the shoe is prevented from escaping during braking. In the present embodiment, even during no braking, the protruding portion 34a is in contact with the sliding surface 41a of the slide plate 41. It should be noted that during no braking, the protruding portion 34a does not have to be in contact with the sliding surface 41a of the slide plate 41.

During braking, the brake shoe head 33 advances or retreats relative to the main body frame 31 in the car longitudinal direction. Therefore, the protruding portion 34a slides on the sliding surface 41a of the slide plate 41 in the car longitudinal direction. In the present embodiment, the sliding surface 41a has a circular-arc shape that is convex inward in the car width direction when viewed from a vertical direction.

In conjunction with the displacement of the wheelset 11 in the car longitudinal direction by the steering, the brake unit 30 and the brake unit support link 40 are also displaced. Therefore, a relative displacement magnitude between the brake unit 30 and the brake unit support link 40 is suppressed. On this account, the protruding portion 34a of the link member 34 does not move beyond the sliding surface 41a that is a sliding range during steering and braking.

Figure 4:
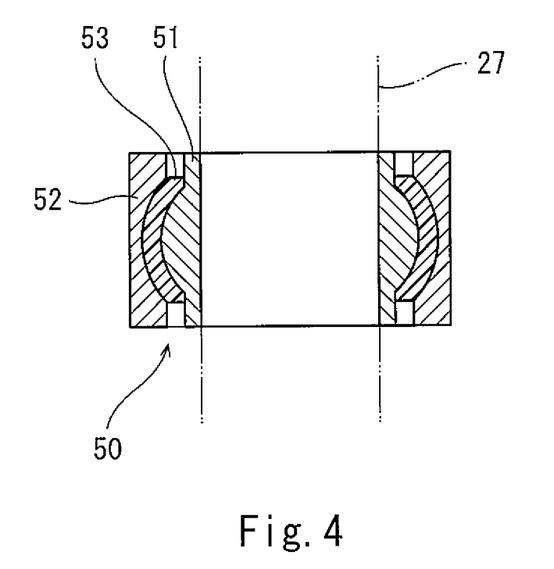
FIG. 4 is a horizontal sectional view of a spherical bearing shown in FIG. 3.

Next, the spherical bearing 50 coupling the brake unit support link 40 and the axle beam 16 or coupling the brake unit support link 40 and the main body frame 31 will be explained. FIG. 4 is a horizontal sectional view of the spherical bearing 50 shown in FIG. 3. As shown in FIG. 4, the spherical bearing 50 includes an inner tube 51, an outer tube 52, and an elastic body 53 sandwiched between the inner tube 51 and the outer tube 52. The inner tube 51 and the outer tube 52 are made of a metal material. The pin member 27 is press-fitted into the inner tube 51.

In the present embodiment, the elastic body 53 is made of self-lubricating rubber. The self-lubricating rubber is rubber having lubricity. Therefore, lubricant is not interposed between the inner tube 51 and the outer tube 52 in the spherical bearing 50. On this account, a gap between the inner tube 51 and the outer tube 52 is smaller than a gap in a spherical bearing including an elastic body made of normal rubber.

The spherical bearings 50 configured as above are provided at both respective end portions 40a and 40b of the brake unit support link 40 (see FIGS. 2 and 3). Therefore, even when the wheelset 11 tilts relative to the bogie frame 6 in the yawing direction during, for example, steering, the outer tube 52 turns relative to the inner tube 51 in a plan view, so that the brake unit support link 40 can support the brake unit 30 in an appropriate posture. Further, the protruding portion 34a of the link member 34 is in contact with the sliding surface 41a. Therefore, even when a load acting outward in the car width direction is applied to the brake unit support link 40, the outer tube 52 is displaced relative to the inner tube 51 in the car width direction, so that the brake unit support link 40 can support the brake unit 30 in an appropriate posture.

The steering bogie 1 configured as above has the following effects.

The displacement of the wheelset 11 in the car longitudinal direction is transmitted to the brake unit 30 by the brake unit support link 40, and the brake unit support link 40 and the brake unit 30 are displaced in the car longitudinal direction in conjunction with each other. Therefore, the relative displacement magnitude between the brake unit support link 40 and the brake unit 30 is suppressed during the steering of the wheelset 11, and it is unnecessary to lengthen the sliding surface 41a of the brake unit support link 40 in the car longitudinal direction. On this account, the weight of the steering bogie 1 can be prevented from increasing while appropriately preventing the brake shoe 32 from escaping in the car width direction.

The sliding surface 41a is provided at the car width direction inside surface 40c of the brake unit support link 40. To be specific, the sliding surface 41a is provided at a side close to the brake unit 30. With this, while appropriately restricting the brake unit 30 from being displaced outward in the car width direction, the brake unit support link 40 can be simplified and compactly formed.

The protruding portion 34a configured to slide on the sliding surface 41a is formed at the side surface of the brake unit 30 (i.e., at the outside surface 34b of the link member 34). With this, the brake unit 30 includes the shoe escape preventing receiving seat having a simple configuration. Thus, a brake shoe escape preventing structure can be simplified.

Further, the sliding surface 41a has a circular-arc shape that is convex in the car width direction. With this, even when a relative angle between the brake unit support link 40 and the brake unit 30 changes to some extent by the steering of the wheelset 11, the protruding portion 34a of the link member 34 can be stably brought into contact with the sliding surface 41a. Thus, a change in sliding resistance can be suppressed, and this can contribute to an extension of the life of the sliding surface 41a.

The brake unit support link 40 is arranged at a position deviated from the axle beam 16 in the vertical direction (in the present embodiment, in the vertically lower direction). Therefore, the brake unit support link 40 is easily accessible from the car width direction. Thus, the ease of maintenance improves.

The spherical bearings 50 are provided at both respective end portions 40a and 40b of the brake unit support link 40. Therefore, even when a load acting outward in the car width direction is applied to the brake unit support link 40 by the contact of the protruding portion 34a of the link member 34 with the sliding surface 41a, the spherical bearings 50 can stably receive the load.

The elastic body 53 of the spherical bearing 50 is made of the self-lubricating rubber. Therefore, as compared to a case where normal rubber is used, a displacement allowable degree of the spherical bearing 50 increases, so that the gap between the inner tube 51 and the outer tube 52 can be made small. On this account, when the brake unit support link 40 is coupled to the main body frame 31 and the axle beam 16 through the spherical bearings 50, backlash of the brake unit support link 40 in the car longitudinal direction becomes smaller than that in a case where the spherical bearing including the elastic body made of normal rubber is used. As a result, even when the brake unit 30 is displaced in the car longitudinal direction together with the brake unit support link 40 by the steering of the wheelset 11, the pressing force of the brake shoe 32 during braking suitably acts on the wheel tread 10a of the wheel 10. Thus, the responsiveness of the brake unit 30 improves.

By using the spherical bearing 50 including the elastic body 53 made of the self-lubricating rubber, backlash of the brake unit support link 40 in the car width direction also becomes small. As a result, even when the load acting outward in the car width direction by the contact of the protruding portion 34a of the link member 34 with the sliding surface 41a of the brake unit support link 40 is applied to the brake unit support link 40 during braking, the displacement of the brake unit support link 40 outward in the car width direction by the backlash can be suppressed, and therefore, the displacement of the brake shoe 32 outward in the car width direction can be more appropriately prevented.

Embodiment 2

A steering bogie 201 according to Embodiment 2 is obtained by partially modifying, for example, the configuration of the bogie frame 6 of the steering bogie 1 according to Embodiment 1. Hereinafter, differences of the steering bogie 201 according to Embodiment 2 from the steering bogie 1 according to Embodiment 1 will be mainly explained.

Figure 5:
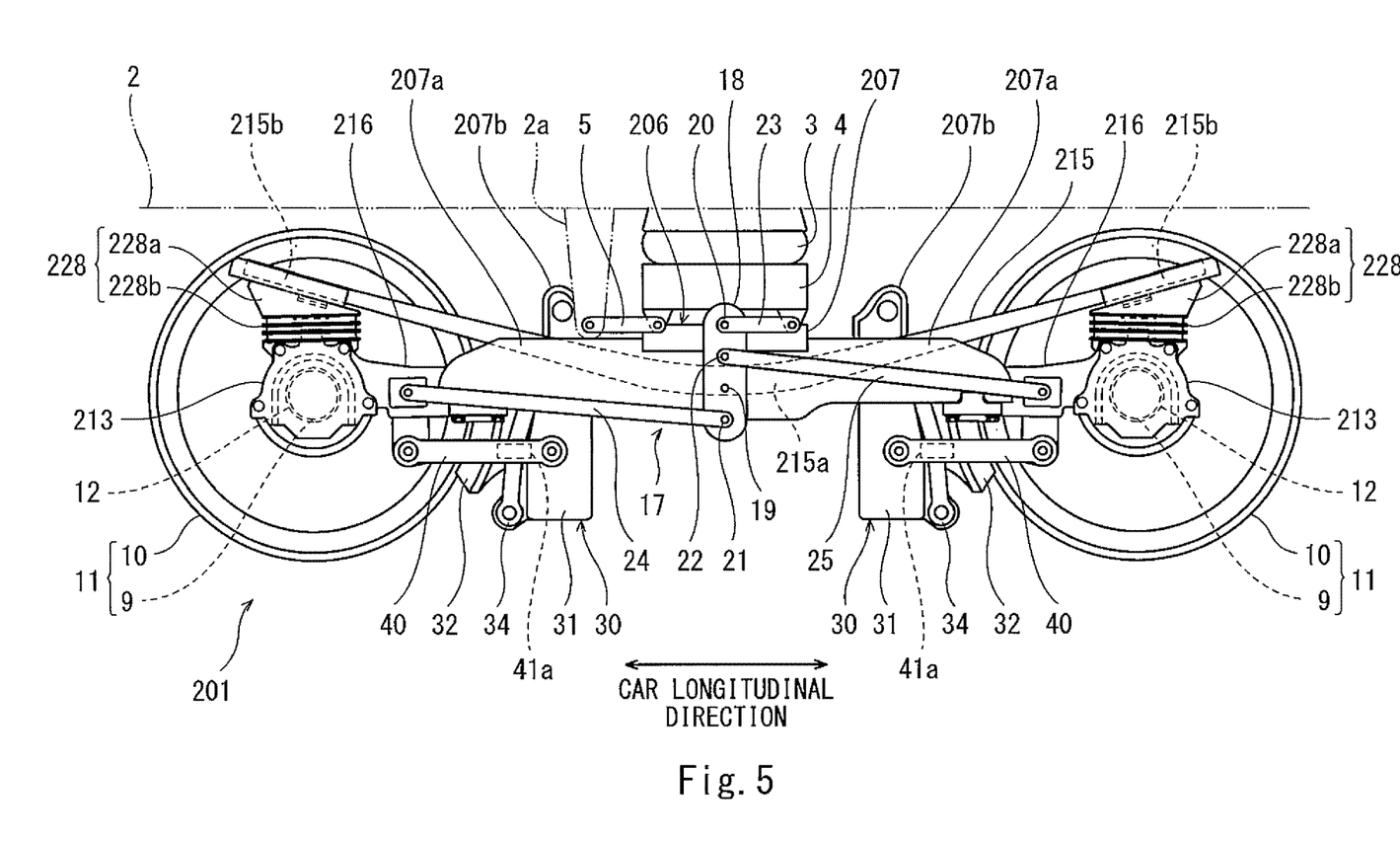
FIG. 5 is a side view of the railcar steering bogie according to Embodiment 2.

FIG. 5 is a side view of the steering bogie 201 according to Embodiment 2. As shown in FIG. 5, a bogie frame 206 of the steering bogie 201 includes a cross beam 207 extending in the car width direction at a car longitudinal direction middle of the steering bogie 201 but does not include side sills extending from both respective car width direction end portions of the cross beam 207 in the car longitudinal direction. Receiving seats 207a to which tip end portions of axle beams 216 are coupled are provided at both car width direction end portions of the cross beam 207.

Each of plate springs 215 extends between an axle box 213 and the cross beam 207 in the car longitudinal direction. A car longitudinal direction middle portion 215a of the plate spring 215 supports the car width direction end portion of the cross beam 207 from below. Both car longitudinal direction end portions 215b of the plate spring 215 are supported by the respective axle boxes 213. To be specific, the plate spring 215 has the function of the axle spring 15 (primary suspension) of Embodiment 1 and the function of the side sill 8 of Embodiment 1.

The car longitudinal direction end portion 215b of the plate spring 215 is supported by the axle box 213 through a supporting member 228 from below. The supporting member 228 includes a receiving member 228a and a vibration-proof rubber 228b. The receiving member 228a supports a lower surface of the plate spring 215, and an upper surface of the receiving member 228a is inclined obliquely downward toward a middle side in the car longitudinal direction. It should be noted that the upper surface of the receiving member 228a does not have to be inclined as long as the upper surface of the receiving member 228a is substantially parallel to the lower surface of the plate spring 215. The vibrationproof rubber 228b is substantially columnar and inserted between the axle box 213 and the receiving member 228a.

An upper portion of the main body frame 31 of the brake unit 30 is rotatably attached to an attaching seat 207b of the cross beam 207. The attaching seat 207b is fixed to a car longitudinal direction outer side surface of the cross beam 207 by welding or the like and projects upward beyond an upper end of the receiving seat 207a. Other than the above configuration, Embodiment 2 is the same as Embodiment 1.

Embodiment 2 explained as above has the same effects as Embodiment 1. To be specific, the weight of the steering bogie 201 including the plate spring 215 can be prevented from increasing while appropriately preventing the brake shoe 32 from escaping in the car width direction.

The present invention is not limited to the above embodiments, and modifications, additions, and eliminations may be made within the scope of the present invention. The above embodiments may be combined arbitrarily. For example, some of components or methods in one embodiment may be applied to another embodiment. Further, some of components in an embodiment may be separated and extracted arbitrarily from the other components in the embodiment. In the above embodiment, the sliding surface 41a is provided at the slide plate 41 fixed to the brake unit support link 40. However, the slide plate 41 does not have to be fixed, and a part of the inside surface 40c may serve as a sliding surface. The sliding surface 41a may be provided at the side surface of the brake unit 30 (for example, at the outside surface 34b of the link member 34), not at the brake unit support link 40. In this case, the protruding portion 34a may be provided at the brake unit support link 40. Further, in the above embodiment, the brake unit support link 40 is arranged so as to be deviated from the axle beam main body portion 16a in the vertically lower direction but may be arranged so as to be deviated in a vertically upper direction. The elastic body 53 of the spherical bearing 50 is not limited to the self-lubricating rubber but may be formed by normal rubber.

REFERENCE SIGNS LIST 1, 201 railcar steering bogie (steering bogie)
6, 206 bogie frame
9 axle
10 wheel
10a wheel tread
11 wheelset
16, 216 axle beam
17 steering mechanism
30 brake unit
31 main body frame
32 brake shoe
34b outside surface (side surface)
40 brake unit support link
40c inside surface (side surface)
41a sliding surface
50 spherical bearing
51 inner tube
52 outer tube
53 elastic body

The invention claimed is:

1. A railcar steering bogie comprising:
a bogie frame;
a wheelset including an axle and a pair of wheels;
an axle box suspension coupling an axle box and the bogie frame, the axle box accommodating a bearing supporting the axle;
a steering mechanism configured to steer the wheelset;
a brake unit including
a main body frame including an upper portion rotatably attached to the bogie frame and
a brake shoe supported by the main body frame and pressed against a wheel tread of the wheel during braking; and
a brake unit support link coupling the axle box suspension and the brake unit and configured to transmit displacement of the axle box in a car longitudinal direction to the brake unit at least during steering performed by the steering mechanism,
the brake unit support link being outward of the wheel in a car width direction,
the brake unit support link restricting the brake unit from being displaced outward in the car width direction by a predetermined distance or more during the braking,
at least one of a side surface of the brake unit support link and a side surface of the brake unit including a sliding surface.

2. The railcar steering bogie according to claim 1, wherein the other of the side surface of the brake unit support link and the side surface of the brake unit includes a protruding portion configured to slide on the sliding surface.

3. The railcar steering bogie according to claim 1, wherein:
the brake unit support link extends in the car longitudinal direction outward of the wheel in the car width direction and is opposed to the brake unit from outward of the brake unit in the car width direction; and
the sliding surface is at an inside surface of the brake unit support link in the car width direction.

4. The railcar steering bogie according to claim 3, wherein:
the axle box suspension includes an axle beam coupling the axle box and the bogie frame and extending in the car longitudinal direction; and
the brake unit support link is arranged at a position deviated from the axle beam in a vertical direction.

5. The railcar steering bogie according to claim 1, wherein the sliding surface has a circular-arc shape that is convex in the car width direction.

6. The railcar steering bogie according to claim 1, wherein one end portion of the brake unit support link is coupled to the axle box suspension through a spherical bearing, and the other end portion of the brake unit support link is coupled to the main body frame through a spherical bearing.

7. The railcar steering bogie according to claim 6, wherein:
each of the spherical bearings includes an inner tube, an outer tube, and an elastic body sandwiched between the inner tube and the outer tube; and
the elastic body is made of self-lubricating rubber.

* * * * *